(12) United States Patent
Dixon et al.

(10) Patent No.: US 6,697,857 B1
(45) Date of Patent: Feb. 24, 2004

(54) CENTRALIZED DEPLOYMENT OF IPSEC POLICY INFORMATION

(75) Inventors: William H. Dixon, Seattle, WA (US); Krishna Ganugapati, Redmond, WA (US); Abhishek Abhishek, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 725 days.

(21) Appl. No.: 09/591,567

(22) Filed: Jun. 9, 2000

(51) Int. Cl.$^7$ .............................................. G06F 15/173
(52) U.S. Cl. ...................... 709/224; 709/202; 709/226; 709/229; 709/244; 713/153
(58) Field of Search ................................. 709/200–203, 709/223–224, 226–229, 244; 713/150, 153, 200–201

(56) References Cited

U.S. PATENT DOCUMENTS 6,009,455 A * 12/1999 Doyle ........................ 709/201
6,336,128 B1 * 1/2002 Eisenmann et al. ......... 709/200
6,363,424 B1 * 3/2002 Douglas et al. ............. 709/224
6,484,257 B1 * 11/2002 Ellis ........................... 713/153

OTHER PUBLICATIONS

IPSec, "ICSA IPSEC Product Certification Criteria Version 1.0A", *ICSA IPSec Product Certification Version 1.0A Testing*, Dec. 22, 1999 (pp. 1 of 8).
IPSec, "ICSA IPSEC Product Certificat Criteria Version 1.1", *ICSA IPSec Product Certification Version 1.1 Testing*, Dec. 22, 1999 (pp. 1 of 4).
Security SnapShot, ICSA.net's Security Snapshot and ESnap are the quickest way's to estimate your company's Internet security posture in six important risk categories, (pp. 1 of 3) Apr. 5, 2000.
Harkins, D. et al., "The Internet Key Exchange (IKE)", Network Working Group, RFC 2409 (Nov. 1998) pp. 1–38.
Maughan, D. et al., Internet Security Association and Key Management Protocol (ISAKMP), Network Working Group RFC 2408, (Nov. 1998) pp. 1–79.
Piper, D., "The Internet IP Security Domain of Interpretation for ISAKMP", Network Working Group, RFC 2407, (Nov. 1998) pp. 1–30.
Kent, S., et al., "IP Encapsulating Security Payload (ESP)", Network Working Group, RFC 2406, (Nov. 1998) pp. 1–21.
Madson, C., et al., "The ESP DES–CBC Cipher Algorithm With Explicit IV", Network Working Group, RFC 2405, (Nov. 1998) pp. 1–10.
Madson, C., et al., "The Use of HMAC–SHA–1–96 within ESP and AH", Network Working Group, RFC 2404, (Nov. 1998) pp. 1–7.
Madson, C., et al., "The Use of HMAC–MD5–96 within ESP and AH", Network Working Group, RFC 2403, (Nov. 1998) pp. 1–7.

(List continued on next page.)

*Primary Examiner*—Bharat Barot
(74) *Attorney, Agent, or Firm*—Leydig, Voit & Mayer, Ltd.

(57) ABSTRACT

A method of network security policy administration for a network client uses a finite state machine to maintain the security policy information of the network client. Security policy information may originate in a remote source such a directory storage as well as, or alternatively, locally in cache and local store locations. The finite state machine has four states, Initial, DS, Cache, and Local, and transitions between states responsive to the availability of security policy information from the various policy information sources. Furthermore, security policy updates occur via a differencing mechanism, wherein only filters that have changed are updated, minimizing impact on unchanged policy filters and the traffic protected by them, and minimizing lulls in policy coverage.

16 Claims, 11 Drawing Sheets

(Architecture)

OTHER PUBLICATIONS

Pereira, R., et al., "The ESP CBC–Mode Cipher Algorithms", Network Working Group, RFC 2451, (Nov. 1998) pp. 1–13.

Orman, H., "The Oakley Key Determination Protocol", Network Working Group, RFC 2412, (Nov. 1998) pp. 1–51.

Kent, S. et al., "IP Authentication Header", Network Working Group, RFC 2402, (Nov. 1998) pp. 1–21.

Thayer, R., et al., "IP Security Document Roadmap", Network Working Group, RFC 2411, (Nov. 1998) pp. 1–11.

Glenn, R., et al., "The Null Encryption Algorithm and Its Use with IPsec", Network Working Group, RFC 2410, (Nov. 1998) pp. 1–6.

Kent, S., et al., "Security Architecture for the Internet Protocol", Network Working Group, RFC 2401, (Nov. 1998) pp. 1–61.

Oehler, M., et al., "HMAC–MD5 IP Authentication with Replay Prevention", Network Working Group, RFC 2085, (Feb. 1997) pp. 1–6.

Krawczyk, H., et al., "HMAC: Keyed–Hashing for Message Authentication", Network Working Group, RFC 2104, (Feb. 1997) pp. 1–11.

Karn, P., et al., "The ESP DES–CBC Transform", Network Working Group, RFC 1829, (Aug. 1995) pp. 1–10.

Metzger, P. et al., "IP Authentication Using Keyed MD5", Network Working Group, RFC 1828, (Aug. 1995) pp. 1–6.

Oehler, M. et al., "HMAC–MD5 Ip Authentication with Replay Prevention", Network Working Group, RFC 2085 (Feb. 1997) pp. 1–6.

* cited by examiner (Hardware)

(Architecture)

(State Diagram)

(Initial to DS State Transition)

(Initial to Cache State Transition)

(Initial to Local State Transition)

(Transitions from DS State)

(Transitions from Cache State)

(Transitions from Local State)

("Policy Change" steps)

(Filter Delta Update)

CENTRALIZED DEPLOYMENT OF IPSEC POLICY INFORMATION

TECHNICAL FIELD

This invention relates generally to network data transmission security and, more particularly, relates to an improved method and system for deployment of IPSec security policy in a centralized manner.

BACKGROUND OF THE INVENTION

The prevalence of network technology has increased dramatically in recent years. From the Internet to intranets, computers throughout the world have become massively interconnected. Businesses, institutions, and private users alike routinely place sensitive information onto networks and rely upon the security of the network to protect the security of such information.

A majority of network traffic utilizes the Internet Protocol (IP) for data transmission. The Internet Protocol, part of the TCP/IP communications protocol, implements the network layer (layer 3) of the protocol, which contains a network address used to route messages. IP has no default security scheme associated with it, and accordingly, IP packets are often easily intercepted, read, copied, corrupted, mimicked and so on.

The IP Security Protocol (IPSec) was designed by the Internet Engineering Task Force (IETF) for IP. IPSec supports network-level authentication, data integrity, and encryption, as well as anti-replay and non-repudiation protection. In contrast to Secure Sockets Layer (SSL) and other transport layer security protocols, IPSec operates at the network layer to secure most types of IP packets. IPSec, as defined by the IETF, uses an authentication header (AH) format and/or an encapsulated security payload (ESP) format to secure IP datagrams. The authentication header provides data communication with source authentication and integrity, while the encapsulated security payload provides confidentiality as well as a limited degree of source authentication.

The keying scheme specified by the IETF for IPSec is the Internet Key Exchange protocol (IKE), documented mainly in IETF RFC 2409. This describes a method whereby the sender and recipient negotiate trust and security settings, including the generation of shared secret cryptographic keys to be used for application data encryption in the AH and ESP IPSec formats. If the authentication data in each IPSec packet is valid, the recipient can be confident that the communication originated from the sender and that it was not altered after transmission.

Windows 2000 implements the Identify Protect Mode of the Internet Key Exchange protocol. In this version of IKE, before application data IP packets can be transmitted from one computer to another, three security associations (SAs) must be established between the communicating parties. The first is called the IKE security association (Main Mode or Phase 1 SA), which serves a high level trusted channel established between the two parties. Then two IPSec security associations (Quick Mode, or Phase 2 SAs) are established; one from peer A to peer B, the other from B back to A. An SA is a set of parameters that defines the services and mechanisms, such as keys, to be used to protect communications. The Internet Security Association Key Management Protocol (ISAKMP) defines a framework for supporting the establishment of security associations without being linked to any specific algorithm or key generation method. The Oakley Key Exchange protocol provides a secure method for exchanging cryptographic key material such that an observer of the communication cannot easily discover the secret shared key generated by the two parties. The Internet Key Exchange (RFC 2409) and the IPSec Domain of Interpretation for ISAKMP (RFC 2408) provide detailed specifications from whence ISAKMP and Oakley are integrated to produce a single IPSec-specific key exchange protocol.

The collection of IPSec parameters applicable to a machine are referred to as an EPSec security policy. Although there may be many possible security policies, a given machine may generally have only one security policy active at a given time. A security policy contains certain policy-wide parameters such as the polling interval to be used to detect changes in policy, as well as parameters such as key lifetimes usable for negotiation of a Main Mode security association. Finally, a security policy also contains one or more rules, each of which further contains several other sets of parameters.

It may often be necessary or desirable for ease of administration to configure security policy for a group of machines, such as a corporate network, in a centralized manner. Thus, for example, a network administrator may establish a source of policy information, such as on a directory service, to be periodically downloaded by specific machines to replace their existing security policy. While this provides for ease of policy change and ease of administration, it is important that each machine have the most up-to-date policy available. Furthermore, if there is a temporary loss of connectivity between a machine and the directory service, it is desirable that the machine in question not suffer a lapse in security by having no policy at all in place at any time. There is needed a method of efficiently obtaining new policy information and updating and applying a machine's IPSec security policy such that there is substantially always a security policy in place on a machine if a policy is assigned to that machine, and such that there is never a significant lull in security coverage.

SUMMARY OF THE INVENTION

The invention provides an improved method and system for the maintenance of centrally deployed IPSec security policy information on individual machines. In an embodiment of the invention, a four-state finite state machine is employed to track and maintain the security policy information of a given machine. By residing in and transitioning between the four states, the state machine effectively maintains the security policy of the machine with the most current security policy information accessible.

The invention provides a mechanism for maintaining the security policy on a machine from a number of sources, namely a directory service, a cache, and a local store. The state machine has four states: "Initial," "DS," "Local," and "Cache." The state machine starts in the initial state, and sequentially tries to plumb, or obtain and apply, the DS policy, Cache policy, and local Store policy. Success at any stage will divert the state machine to the appropriately named state. For example, if plumbing the DS policy succeeds, the state machine transitions to a DS state. From the various states, polling occurs to check for a change in the assigned policy. If the assigned policy has changed, the state machine transitions appropriately to obtain the new policy.

Additional features of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
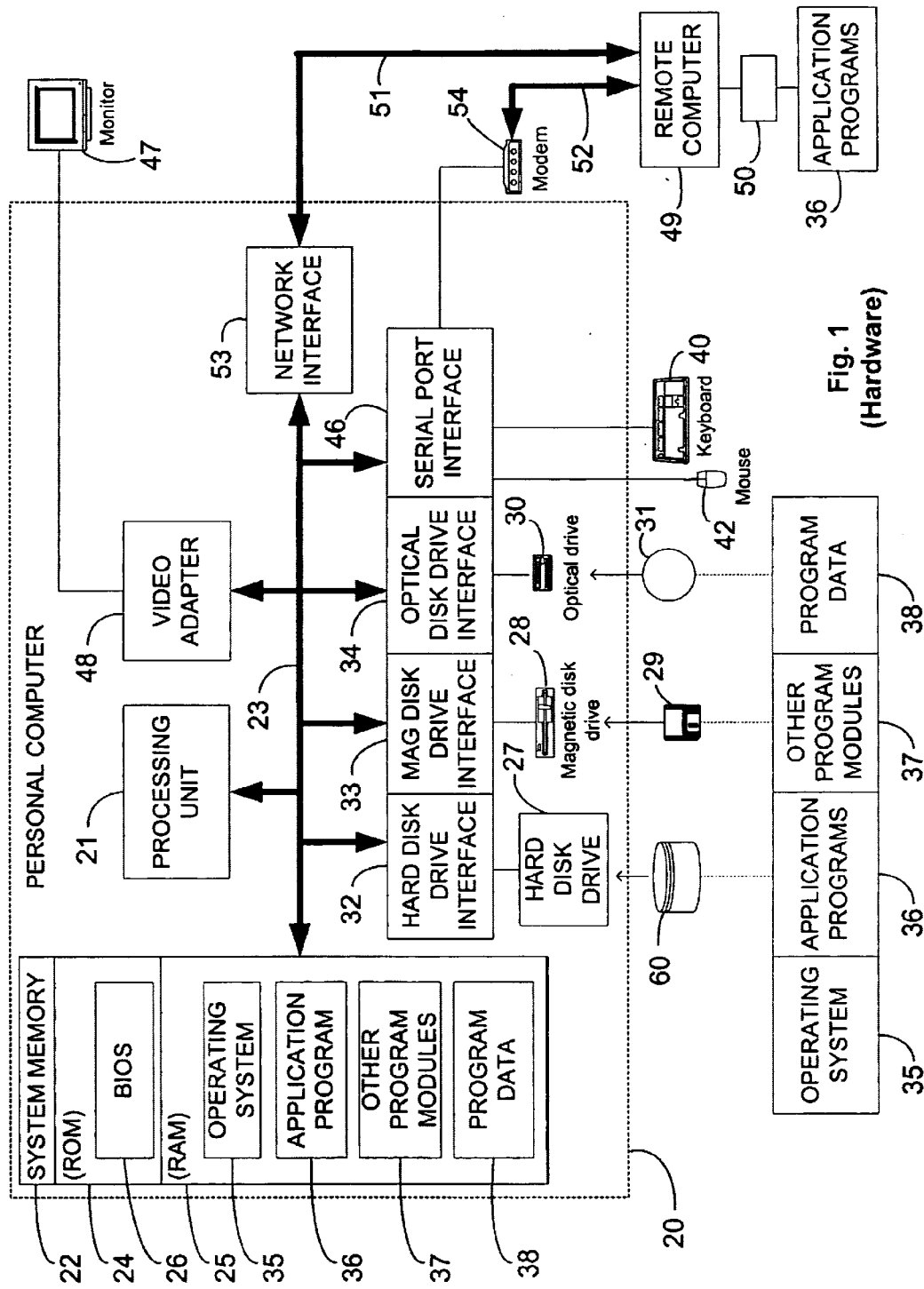
FIG. 1 is a block diagram generally illustrating an exemplary computer system usable to implement an embodiment of the invention.

Turning to the drawings, wherein like reference numerals refer to like elements, the invention is illustrated as being implemented in a suitable computing environment. Although not required, the invention will be described in the general context of computer-executable instructions, such as program modules, being executed by a personal desktop computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 operates in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. One remote computer is preferably a remote store such as a Microsoft brand WINDOWS 2000 Active Directory on the Internet or another network. Retrieval of information from the store may be via LDAP (Lightweight Directory Access Protocol) over cable modem or DSL, 802.1x wireless, cellular, or any other form of connectivity to the Internet or other network.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware. For more background information regarding the IPSec protocol, the reader is invited to consult the IETF Requests For Comments (RFC's) regarding IPSec, i.e. RFC's 2085, 2104, 2401–2412, and 2451, which are hereby incorporated by reference in their entireties.

Figure 2:
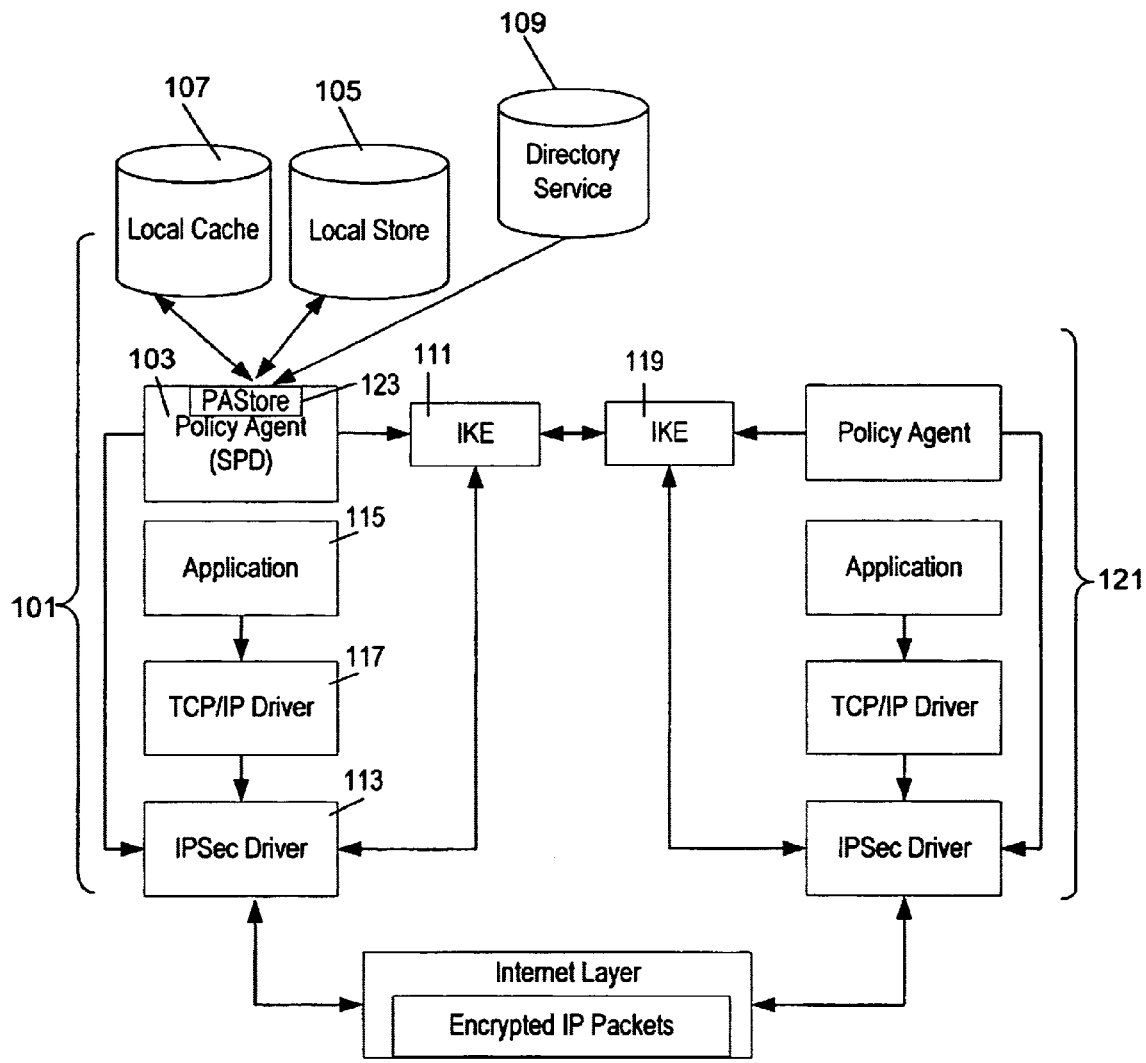
FIG. 2 is an application architectural diagram illustrating functional components usable within an embodiment of the invention.

Referring to FIG. 2, the IPSec architecture for a given computer 101 includes a policy agent 103, which functions as a "Security Policy Database" referenced in RFC 2401, for obtaining IPSec policy information from a Directory Service 105, a local cache 107, or a local store 109. Directory Service information may be retrieved via an appropriate protocol such as Lightweight Directory Access Protocol (LDAP) from a Directory Service 105 that supports LDAP. Alternatively the Directory Service 105 may be a specialized policy server. An IKE module 111 and an IPSec driver 113 both receive policy information from the policy agent 103. References to "SPD" are generic references to the "SPD" as defined in RFC 2401, and as implemented (IPSec Policy Agent Service) in the Microsoft Brand WINDOWS 2000 operating system. More information regarding central deployment of policy information may be found in commonly owned U.S. patent application Ser. No. 09/134,805, entitled "System and Method for Implementing Group Policy," filed on Aug. 14, 1998, and U.S. patent application Ser. No. 09/268,455, also entitled "System and Method for Implementing Group Policy," filed on Mar. 16, 1999, both of which are hereby incorporated by reference in their entireties.

In overview with respect to the EPSec protocol, an application 115 may direct a packet of information to the network via the TCP/IP driver 117. This information is passed to the IPSec driver 113. The IPSec driver 1 13 determines when network traffic requires IPSec protection via filters within the IPSec driver 113. These filters determine whether security is required for a given packet based on parameters such as source address, source mask, destination address, destination mask, protocol, source port, destination port, and filter type. In a simple example, an IPSec filter may mandate security for all Telnet packets that are from machine A, to machine B. If an outgoing packet matches a filter and no appropriate valid security association exists, IKE 111 is invoked to negotiate an appropriate security association. This negotiation takes place between the local IKE module 111 and the IKE module 119 of the peer machine 121. According to the IPSec protocol, IKE may be invoked to negotiate a new security association in other circumstances as well. Once an association has been established, IKE sends the SA to the EPSec driver and the association is thereafter used by the IPSec driver 113 to secure outgoing traffic until the association expires.

Figure 3:
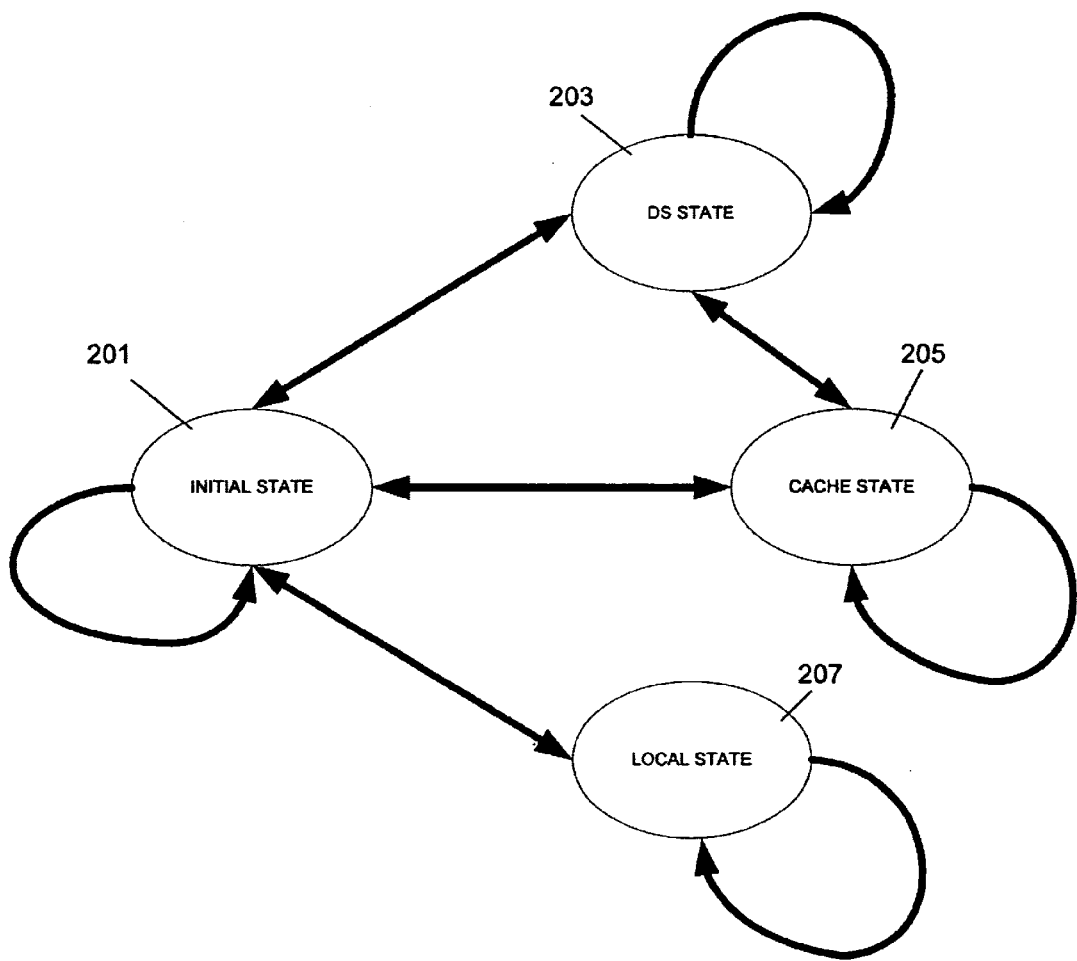
FIG. 3 is state diagram illustrating the states of a finite state machine and their interrelationships according to an embodiment of the invention.

A finite state machine usable in an embodiment of the invention is illustrated in FIG. 3. The state machine of FIG. 3 may be implemented by a Policy Agent Store module 123 (PAStore) which acts to obtain current policy information for the Policy Agent. The state machine comprises four states: Initial 201, DS 203, Cache 205 and Local 207. As will be described more fully hereinafter, PAStore resides in and transitions between the states of the state machine depending upon the occurrence of certain circumstances so as to apply the most current IPSec policy available to the machine at any given time, without allowing for a lapse in security.

Figure 4:
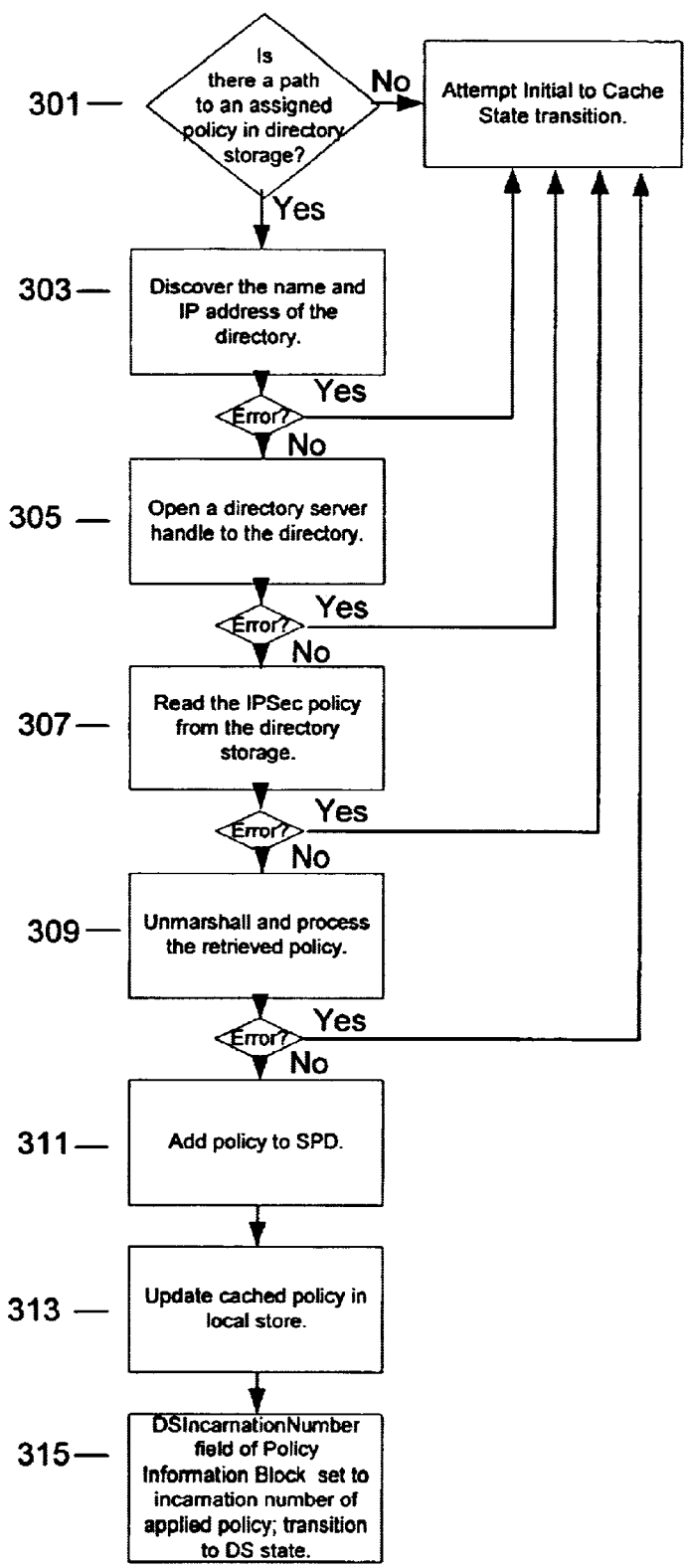
FIG. 4 is a flow chart illustrating steps taken to obtain policy information at the Initial state according to an embodiment of the invention (Initial to DS State Transition)

Preferably, when PAStore first begins to function, as upon start up of the computer or otherwise, it loads a default Main Mode policy. The default policy may be obtained from an appropriate local directory. After adding this policy, PAStore begins to utilize the 4-state finite state machine. At the outset PAStore is in the Initial state 201. From the Initial state 201, transitions to the DS 203, Cache 205, and Local 207 states occur as indicated in the flow charts of FIGS. 4–6. As illustrated in FIG. 4, PAStore first tries to plumb the assigned directory storage IPSec policy. Accordingly, in step 301, PAStore accesses a Policy Path field to determine the path to the assigned policy in directory storage. If this field is empty, then no directory storage policy is assigned to this machine. In this case, PAStore will attempt to access the cached policy. Otherwise, in step 303, PAStore computes the default directory.

If this fails for any reason, PAStore will attempt to access the cached policy. Otherwise, in step 305, PAStore opens a directory server handle to the default directory. Again, if this fails for any reason, PAStore will attempt to access the cached policy. Otherwise, in step 307 PAStore reads the IPSec policy from the directory storage using the directory server handle and the DSIPSecPolicyPath. If this fails for any reason, PAStore will attempt to access the cached policy. In step 309, PAStore unmarshalls and processes the policy into a usable form, such as a PAStore representation. Using this representation, in the absence of error the policy is added to a Security Policy Database (SPD) in step 311. The cached policy in the local store is then updated in step 313. Finally, in step 315, a DSIncarnationNumber field of a Policy State Information Block is set to reflect the incarnation number of the applied policy, and the PAStore transitions to the DS state.

The Policy State Information Block preferably comprises the following:

CurrentState;
CurrentPollingInterval;
DefaultPollingInterval;
DSIncarnationNumber;
RegIncarnationNumber;

DomainName;
DirectoryPolicyDN;
RegistryPolicyDN; and
CachePolicyDN;
Wherein: CurrentState denotes the current state of PAStore; CurrentPollingInterval denotes the current polling interval after which PAStore will check the storage for updates to currently applied policy, with a value of zero implying an infinite time; DefaultPollingInterval denotes the default polling interval after which PAStore will check the storage for updates to currently applied policy; DSIncarnationNumber represents the dwWhenChanged field of the currently applied policy when the policy has been obtained from directory storage; RegIncarnationNumber represents the dwWhenChanged field of the currently applied policy when the policy has been obtained from local storage; DomainName denotes the name of the domain to which the machine belongs, and is null if the machine is part of no domain; DirectoryPolicyDN represents the name of the applied directory storage policy if PAStore is in the DS state, and is null if PAStore is in the Initial state; RegistryPolicyDN represents the name of the applied local policy if PAStore is in the Local state, and is null if PAStore is in the Initial state; and CachePolicyDN represents the name of the applied cached policy if PAStore is in the Cache state, and is null if PAStore is in the Initial state.

Figure 5:
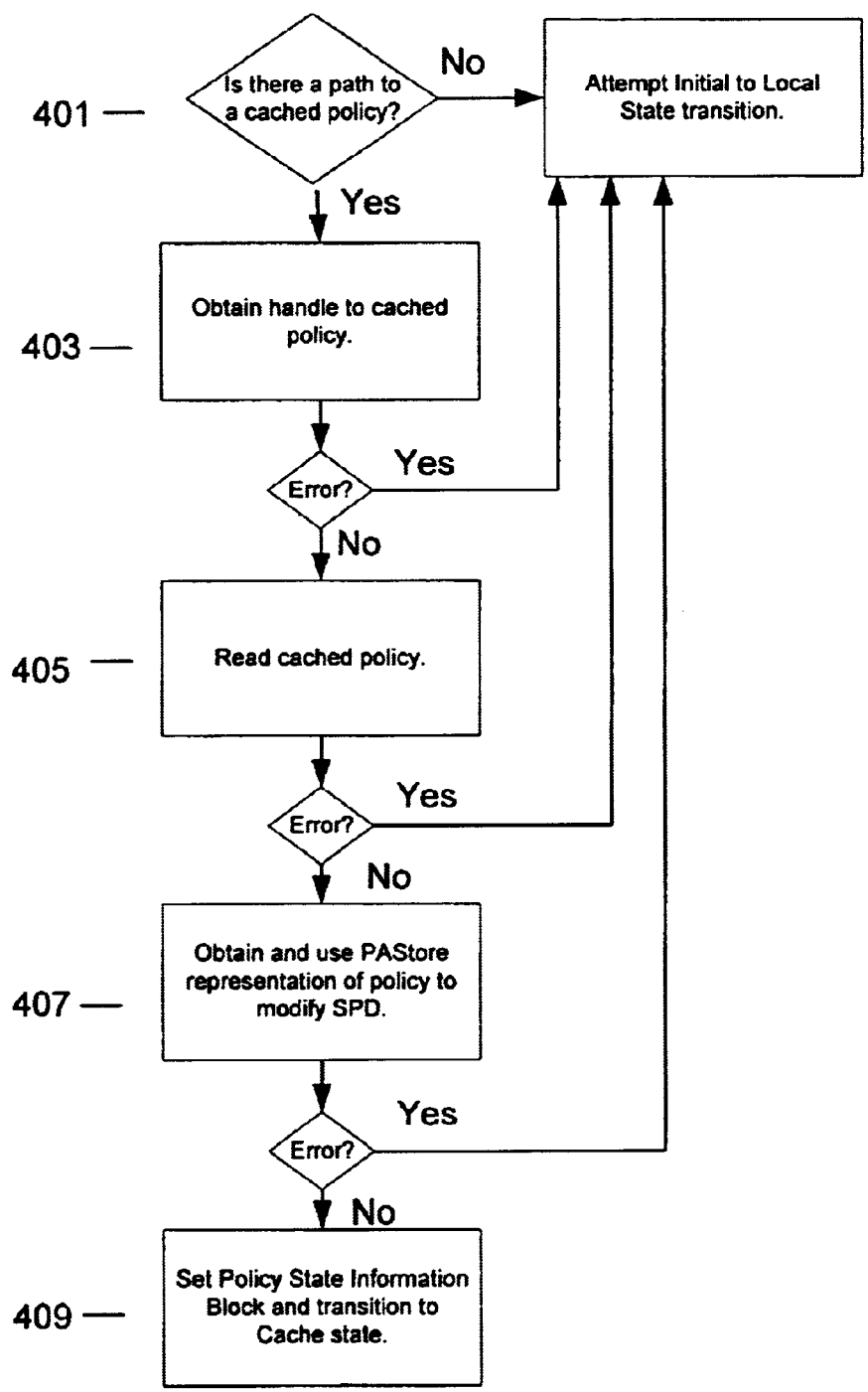
FIG. 5 is a flow chart illustrating further steps that may be taken to obtain policy information at the Initial state according to an embodiment of the invention (Initial to Cache State Transition)

As mentioned, PAStore may resort to plumbing the cached policy under certain circumstances. The steps taken under these circumstances are illustrated in FIG. 5. Initially, PAStore retrieves and converts the path from the DSIPSecPolicyPath field into the local store format. If this field is determined to be empty in step 401, then there is no cached policy assigned to the machine, and PAStore attempts to plumb the active local policy as illustrated by the flow chart of FIG. 6. Note that there may exist many local policies, but preferably only one of these is assigned as active at a given time. It is the active local policy that is of interest. Otherwise, in step 403 PAStore obtains a handle to the cached policy. If this fails for any reason, PAStore should try to plumb the active local policy. In step 405 PAStore reads the cached policy using the local store handle obtained in step 403, and the converted DSIPSecPolicyPath field obtained in step 401. If this fails for any reason, PAStore attempts to plumb the active local policy. In step 407, after unmarshalling and processing the retrieved policy, PAStore uses the PAStore representation of the policy to add this information to the SPD. If PAStore is unable to unmarshall or process the policy, PAStore should try to plumb the active local policy. Finally, in step 409, PAStore sets the Policy State Information Block and transitions to the Cache state. In setting the Policy State Information Block, the RegIncarnationNumber field of the Policy State Information Block receives the incarnation number of the applied IPSec policy. The CurrentPollingInterval field, representative of the current polling interval after which PAStore will check for policy updates, is set in accordance with the policy. A hard-coded default polling interval is preferably set to some reasonable value.

Figure 6:
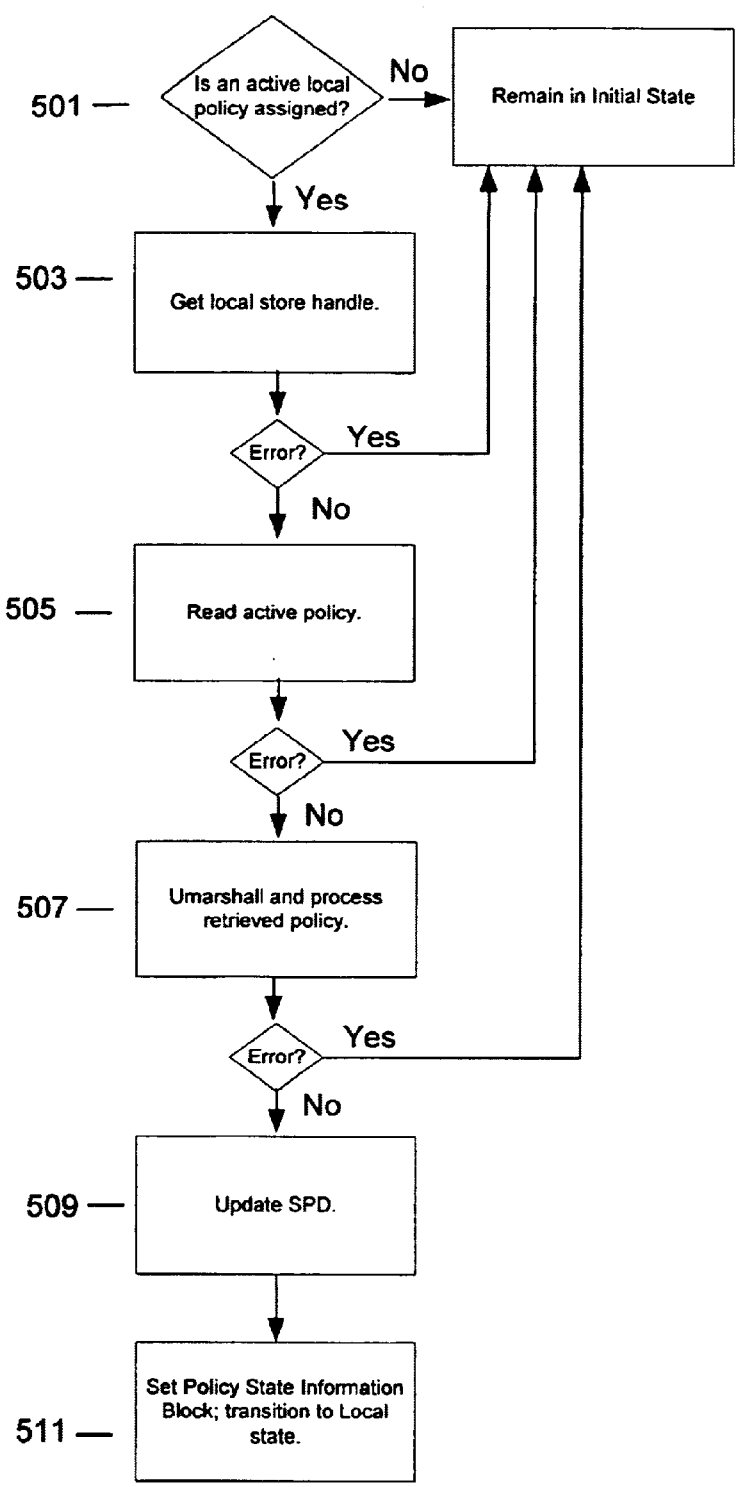
FIG. 6 is a flow chart illustrating further steps that may be taken to obtain policy information at the Initial state according to an embodiment of the invention (Initial to Local State Transition)

As mentioned above, PAStore should resort to plumbing the active local policy under certain circumstances. The steps taken to plumb the active local policy are illustrated in FIG. 6. Initially, PAStore reads the ActivePolicy field to determine the active local policy. If this field is determined to be empty in step 501, there is no active local IPSec policy, and PAStore transitions to, or remains in, the initial state. Otherwise in step 503, PAStore obtains a handle before reading the active policy in step 505 using the handle and ActivePolicy field. The policy is umarshalled and processed in step 507. Using the processed (PAStore representation) policy, PAStore updates the SPD in step 509. If any of steps 503–507 fail, PAStore transitions to, or remains in, the initial state, wherein the CurrentPollingInterval field is set to the default polling interval value. Finally in step 511, PAStore sets the Policy State Information Block and transitions to the Local state. In setting the Policy State Information Block, the RegIncarnationNumber field of the Policy State Information Block receives the incarnation number of the applied IPSec policy. The CurrentPollingInterval field is set equal to the value specified in the policy. If for any reason the relevant polling interval expires while PAStore is still in the Initial state, PAStore executes the Policy Changed transitions as described below.

TRANSITIONS BETWEEN THE DS, CACHE, AND LOCAL STATES

Figure 7:
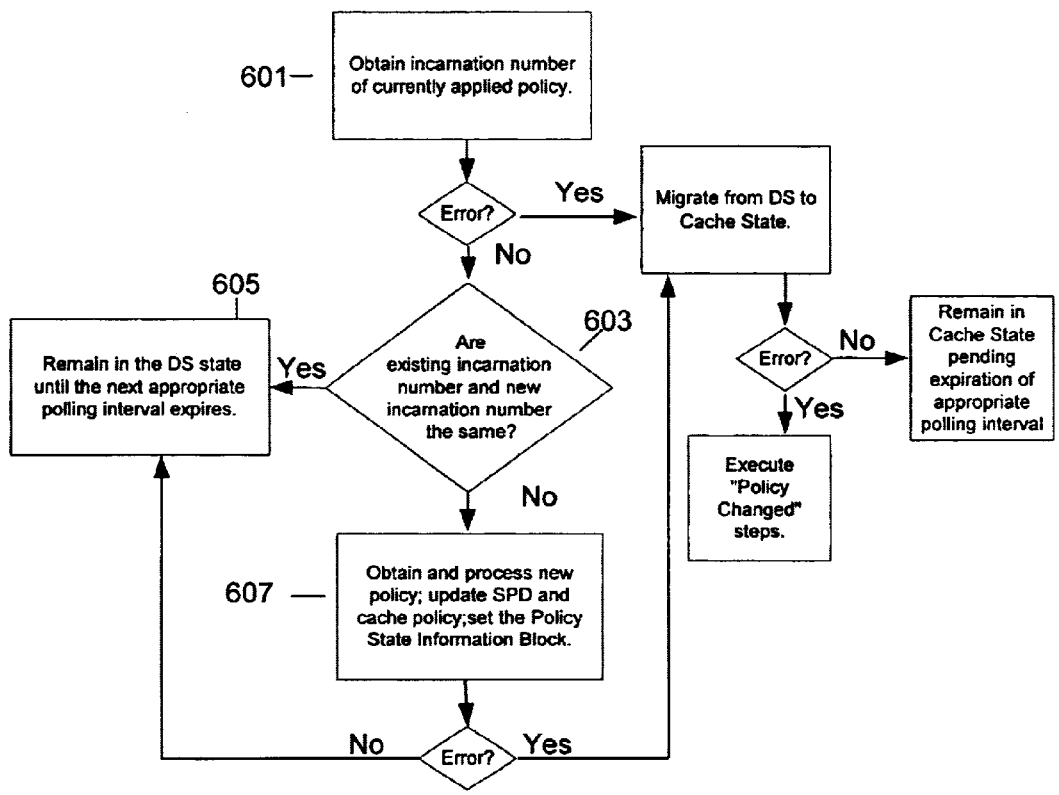
FIG. 7 is a flow chart illustrating the steps taken upon expiration of a polling interval when the current state is the DS state.

Once having transitioned to the DS, Cache, or Local state, the state machine transitions to the same or another state according to various guidelines. In particular, at a polling interval, or otherwise, such as upon determination of a policy change, transition decisions are made. The transition decisions where the current state is the DS state are shown in FIG. 7. In step 601, the incarnation number of the currently applied policy is obtained. If there is any error in obtaining the incarnation number of the currently applied policy, then PAStore transitions to the Cache state as explained below, or, if an error is encountered in transitioning to the Cache state, executes the Policy Changed steps as explained below.

In step 603, PAStore compares the existing incarnation number with the new incarnation number. If these numbers match, then in step 605 the state machine dwells in the DS state until the next appropriate polling interval expires. If the incarnation numbers are different, then in step 607 PAStore obtains and processes the new policy as discussed above, updating the SPD information and cache policy representation. Additionally, PAStore sets the Policy State Information Block and if no error is encountered remains in the DS state. In setting the Policy State Information Block, the DsIncarnationNumber field of the Policy State Information Block receives the new incarnation number of the applied IPSec policy. The CurrentPollingInterval field is set equal to the value specified in the policy. PAStore then awaits expiration of the next appropriate polling interval. If there is any error in obtaining and processing the new policy, the state machine transitions to the Cache state. If there is any error migrating to the Cache state, PAStore executes the Policy Changed steps as explained below.

Figure 8:
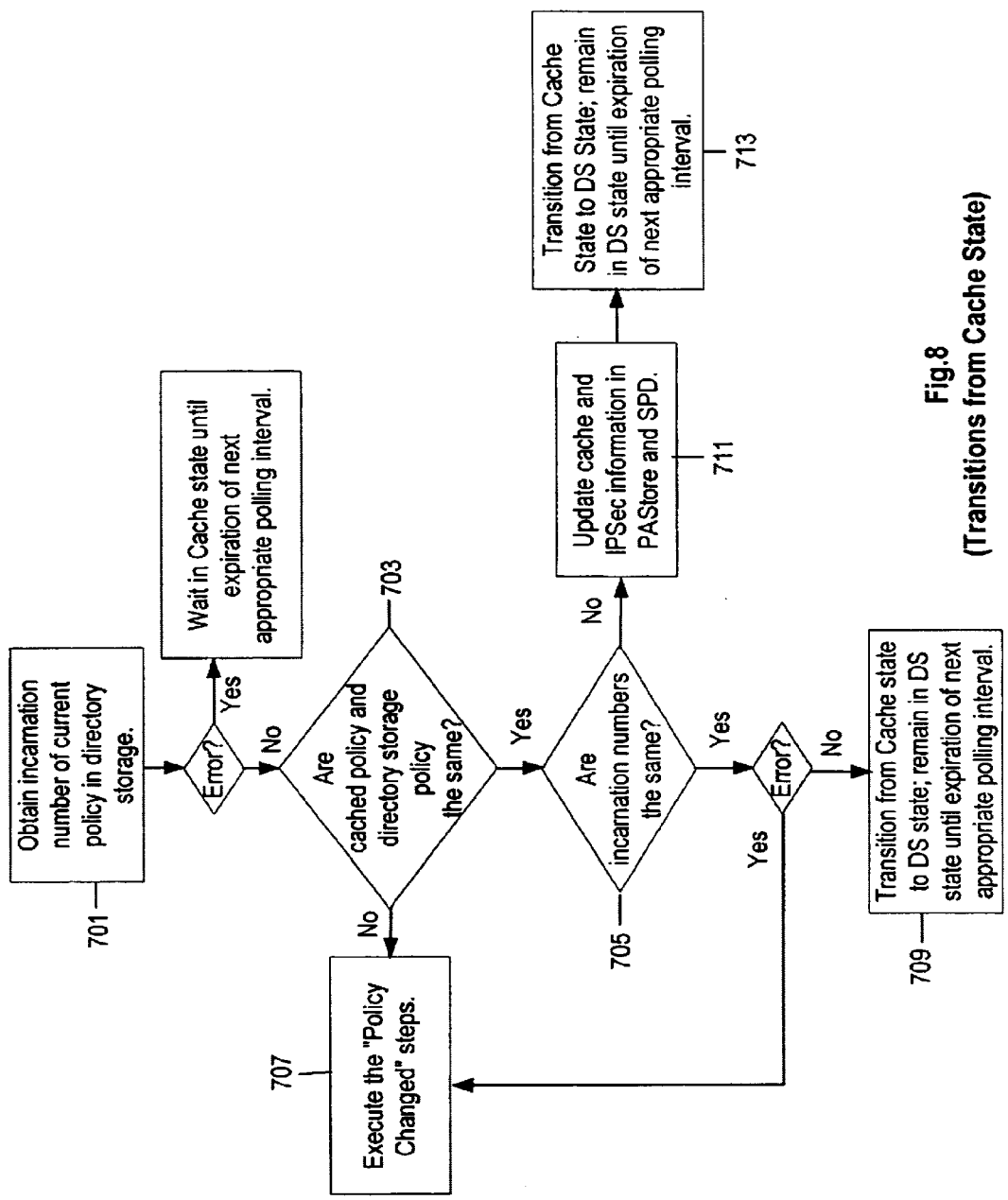
FIG. 8 is a flow chart illustrating the steps taken upon expiration of a polling interval when the current state is the Cache state.

The transition decisions upon polling in the case where the current state is the Cache state are shown in FIG. 8. In step 701 PAStore obtains the incarnation number of the relevant current IPSec policy in directory storage. Upon encountering any error in obtaining the incarnation number, PAStore resides in the Cache state and awaits expiration of the next appropriate polling interval.

In step 703, it is determined whether the cached policy and directory storage policy are the same policy. Whether the policies are the same or not may be determined by comparing the globally unique identifiers (GUIDs) of the policies. If the cached policy and directory storage policy are the same policy then in step 705 PAStore compares their incarnation numbers. Otherwise, in step 707 PAStore should execute the Policy Changed steps as explained below. If the policies are the same and the incarnation numbers match, PAStore transitions from the Cache state to the DS state in step 709, in the manner explained below. If the incarnation number do not match, the cache and IPSec information in the PAStore and the SPD are updated in step 711 as described below, and PAStore transitions from the Cache state to the DS state in step 713. Upon encountering any error during step 705, PAStore executes the Policy Changed transitions as explained below. Additionally, the DsIncarnationNumber field of the Policy State Information Block receives the new incarnation number of the applied IPSec policy, and the CurrentPollingInterval field is set equal to the value specified in the policy.

Figure 9:
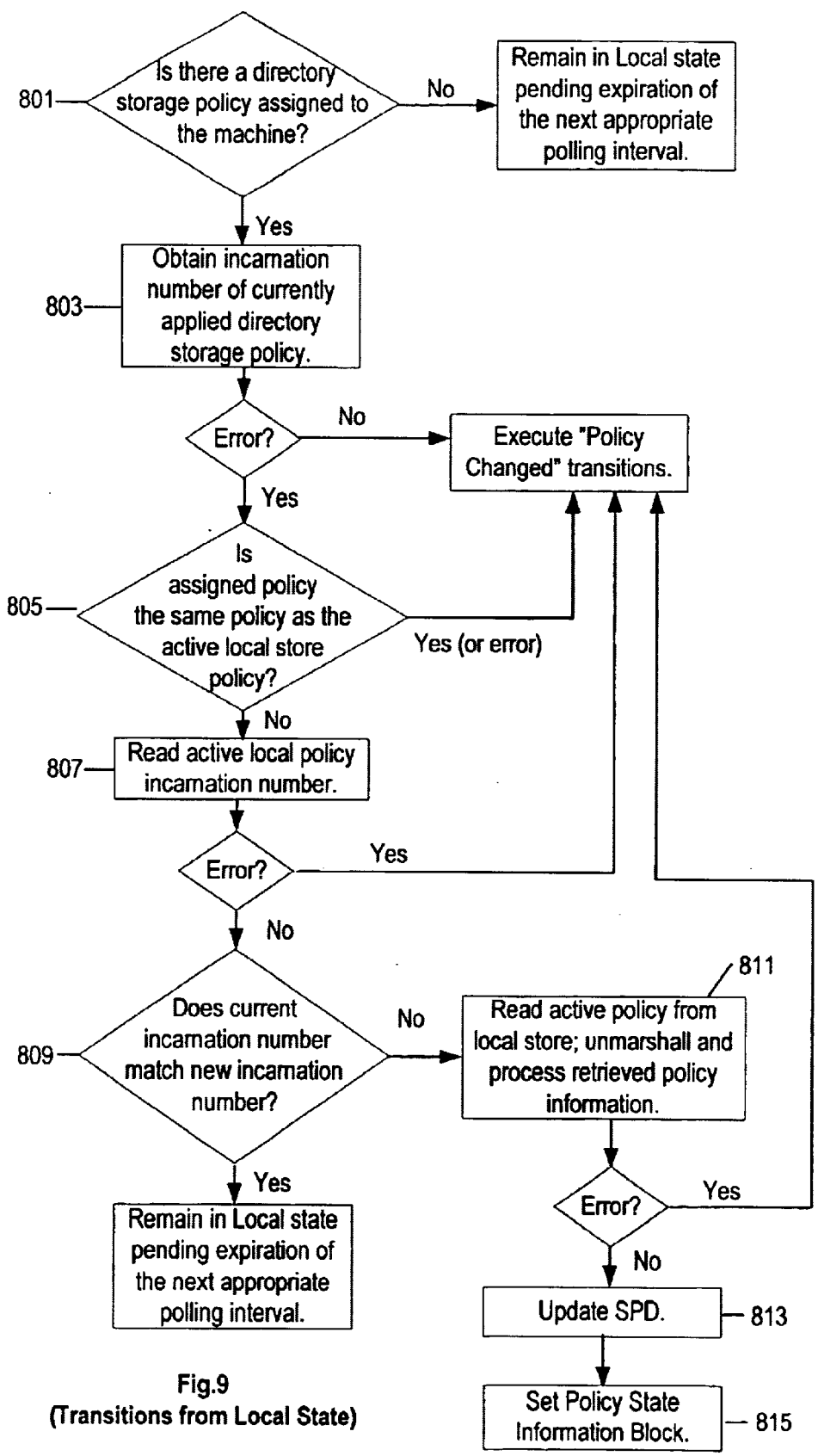
FIG. 9 is a flow chart illustrating the steps taken upon expiration of a polling interval when the current state is the Local state.

If, upon polling, the current state is the Local state, PAStore executes the transition decisions shown in FIG. 9. In particular, in step 801, PAStore determines if in fact there is a directory storage IPSec policy assigned to the machine. If there is not, PAStore remains in the Local state pending the expiration of the next appropriate polling interval. Otherwise, in step 803, PAStore obtains the incarnation number of the currently applied directory storage IPSec policy as described previously, and, barring any error, executes the Policy Changed transitions as explained below. If any error is encountered in executing step 803, then in step 805, PAStore determines whether the assigned policy is the same policy as the active local store policy. If yes, or if there is an error in checking, then PAStore executes the Policy Changed steps. Otherwise, in step 807 PAStore obtains the incarnation number of the currently applied local IPSec policy. If PAStore encounters an error in obtaining the incarnation number, PAStore executes the Policy Changed steps as described below.

Otherwise, PAStore compares the current incarnation number to the new incarnation number in Step 809. If the numbers match, then PAStore resides in the Local state for the next appropriate polling interval to expire. Otherwise, in step 811, PAStore reads and processes the active policy from the local store. (This policy will be in storage representation, and is unmarshalled and processed to obtain a PAStore representation.) If an error is encountered in reading, unmarshalling, or processing the policy, PA store executes the Policy Changed steps as described below.

In step 813, PAStore utilizes the PAStore representation of the policy to update the SPD. Finally, in step 815, the RegIncarnationNumber field of the Policy State Information Block receives the new incarnation number of the applied EPSec policy, and the CurrentPollingInterval field is set equal to the value specified in the policy. PAStore then remains in the Local state pending expiration of the next appropriate polling interval.

Figure 10:
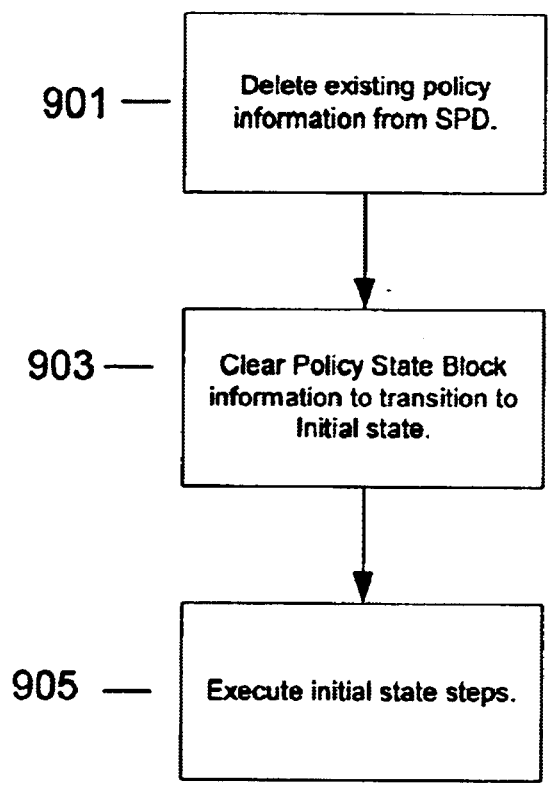
FIG. 10 is a flow chart illustrating steps taken upon receipt of notification of a policy change.

As described above, PAStore executes the Policy Changed steps on the occurrence of certain conditions. However, there are other circumstances that trigger execution of these steps as well. For example, PAStore may be notified of a directory storage or local policy change or addition via events such as "NewDSPolicyEvent" or "NewLocalPolicyEvent" respectively. The "NewDSPolicyEvent" is set by the ipsec extension to Winlogon. Winlogon is a host service that provides single control framework for user authentication to the host system, as well as for both machine and user communication for authentication services of the Active Directory reachable over a network. PAStore sets the "NewLocalPolicyEvent" when it is not in the DS or Cache state and it has been notified by the PolicyStore through the Service Control Manager using a special control code such as SERVICE_CONTROL_NEW_LOCAL_POLICY that there is a new local policy to obtain. The Policy Changed steps proceed as illustrated in FIG. 10.

Initially in step 901, PAStore deletes the existing IPSec policy information from the SPD, as will be explained in greater detail below. Subsequently in step 903, PAStore clears the Policy State Information Block information to transition to the Initial state. Finally in step 905, PAStore begins the initial state steps, i.e. the steps of FIG. 4.

As described, it is necessary under certain circumstances for PAStore to transition from the DS state to the Cache state or from the Cache state to the DS state. In general, in transitioning from DS state to the Cache state, PAStore first reads the DSIPSecPolicyPath field as described above. After converting the path to local store format, PAStore updates the Policy State Information Block using the DSIPSecPolicyPath information and transitions to the Cache state. The RegIncarnationNumber field of the Policy State Information Block is set to the DSIncarnationNumber field value.

In transitioning from the Cache state to the DS state, PAStore first reads the DSIPSecPolicyPath field as described above. PAStore then updates the Policy State Information Block using the DSIPSecPolicyPath information and transitions to the DS state. The DSIncarnationNumber field of the Policy State Information Block is set to the RegIncarnationNumber field value.

In order to update existing cache and SPD policy information, PAStore accesses the DSIPSecPolicyPath field to determine the path to the assigned policy in directory storage. PAStore then computes the default directory. PAStore then opens a directory server handle to the default directory. Subsequently, PAStore reads the IPSec policy from the directory storage using the directory server handle and the DSIPSecPolicyPath and unmarshalls and processes the policy into a usable form, such as a PAStore representation. If PAStore fails at any stage during this process to this point, it returns the error. Using the PAStore representation, the policy is added to the SPD, as will be described, and the cached policy in the local store is then updated to reflect the applied directory storage policy. The CurrentPollingInterval field is set equal to the value specified in the policy. Finally, the DSIncarnationNumber field of the Policy State Information Block is set to reflect the incarnation number of the applied policy, and PAStore transitions to the DS state.

Figure 11:
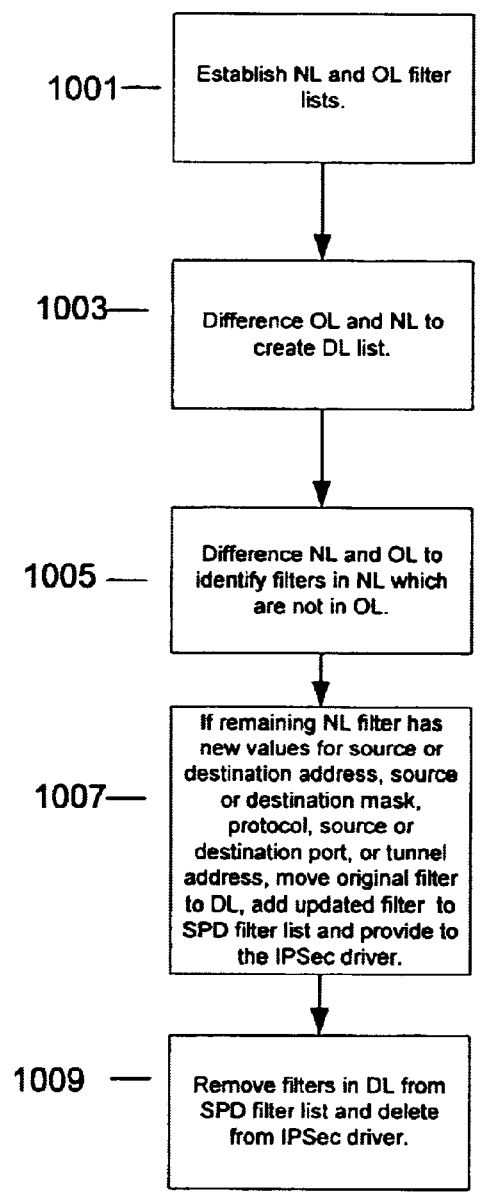
FIG. 11 is a flow chart illustrating a differencing process usable in an embodiment of the invention to seamlessly and efficiently update policy information in an SPD and within a local IKE module.

As noted above, it is necessary under certain circumstances to update the policy information of the IPSec Driver SPD with new or changed policy information. Because it is the SPD that is consulted during inbound and outbound packet processing, it is desirable that the update process be as efficient as possible without causing a lull in protection as might occur if the SPD were updated simply by flushing and rewriting of the policy information. To this end, in accordance with an embodiment of the invention, SPD policy information is updated via a filter differencing process as illustrated in FIG. 11. Each IPSec policy comprises a single Main Mode negotiation rule (ISAKMP Rule) and one or more IPSec Security Rules, or Negotiation to Filter Associations (NFA's). Each NFA further comprises Quick Mode negotiation data and one or more filters, each with associated security actions to occur upon a match of a packet to the filter.

The differencing method for the case in which the IPSec policy changes by virtue of one or more changed filters begins by establishing a list of new filters (NL) and a list of original, or existing, filters (OL), as in step 1001. In step 1003, OL and NL are differenced, creating a list DL of filters which are in OL and not in NL. The filters in DL are removed from OL. Similarly, in step 1005 NL and OL are differenced to identify filters in NL which are not in OL.

These filters are added to the SPD filter list and are provided to the IPSec driver. At this point, remaining filters in NL represent possible updates to original filters. In step 1007 if a remaining filter in NL has new values for source or destination address, source or destination mask, protocol, source or destination port, or tunnel address, the original filter from OL is moved to DL, and the updated filter from NL is added to the SPD filter list and provided to the IPSec driver. Finally, in step 1009 the filters in DL are removed from the NFA filter list and deleted from the IPSec driver.

If a mirrored filter changes such that it is no longer mirrored, then a mirrored flag is changed on the filter and the mirror filter from OL is added to DL. Similarly, if a nonmirrored filter in OL is to be mirrored, the mirrored flag is changed and a new mirror filter is added to the SPD filter list. If the tunnel flag or tunnel IP address, the interface type, or the blocking/clear/passthru flags of the NFA change, or if soft SA are now allowed, then all the filters in OL are moved to DL and the filters in NL are treated as new, rather than changed, filters. The filters in NL are preferably added to the SPD filter list and provided to the IPSec driver before the filters in DL are removed.

In view of the various embodiments to which the principles of this invention may be applied, it should be recognized that the embodiments described herein with respect to the drawing figures are meant to be illustrative only and should not be taken as limiting the scope of invention. For example, those of skill in the art will recognize that many of the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

We claim:

1. A network security system for administration of data transmission security policy comprising:
    a remote source of data transmission security policy information;
    a network client couplable to the remote source for receiving data transmission security policy information, the network client having a computer-readable local memory and having therein a local source of data transmission security policy information;
    a finite state machine located within the computer-readable local memory of the network client for administration of the network client's data transmission security policy, wherein a current state of the finite state machine indicates which of the data transmission security policy information sources is used to supply an active policy of data transmission security policy information applicable to the network client, and wherein the finite state machine transitions between states responsive to the availability of the data transmission security policy information from the remote and local sources.

2. The system according to claim 1, wherein the local source of data transmission security policy information further comprises a local cache source and a local storage source.

3. The system according to claim 2, wherein the finite state machine further comprises:
    an Initial state;
    a DS state, wherein the active policy has been retrieved from the remote source;
    a Cache state wherein the active policy has been retrieved from the local cache source; and
    a Local state wherein the active policy has been retrieved from the local storage source.

4. The system according to claim 3, wherein the remote source is a directory service that supports LDAP.

5. The system according to claim 3, wherein the finite state machine further comprises a policy state information block having a current state field usable to store an indication of the current state of the state machine.

6. The system according to claim 3, wherein a substitution of an original active policy by a new active policy is associated with a transition from one of the DS, Cache and Local states to another of the DS, Cache and Local states, wherein the substitution comprises changing portions of the original active policy that differ from corresponding portions of the new active policy.

7. The system according to claim 3, wherein the finite state machine is administered by a policy agent store module, and wherein when the finite state machine is in the initial state, the policy agent store module firstly attempts to obtain security policy information from the remote source, and secondly attempts to obtain security policy information from the local cache source upon failing to obtain security policy information from the remote source, and thirdly attempts to obtain security policy information from the local storage source upon failing to obtain security policy information from the local cache source.

8. The system according to claim 3, wherein the active policy is used to implement the IETF IPSec protocol.

9. In a computer network having a network client, a method of administering a data transmission security policy for the network client comprising the steps of:
    establishing in a computer-readable memory of the network client a finite state machine, wherein the finite state machine has Initial, Remote, Cache, and Local states, and wherein the Remote, Cache, and Local states correspond to remote, local cache, and local storage sources of data transmission security policy information respectively;
    placing the finite state machine into the Initial state;
    transitioning from the Initial state to the Remote state, wherein data transmission security policy information available from the remote source is used to set the active security policy for the network client, if the network client is able to retrieve the data transmission security policy information from the remote source;
    transitioning from the Initial state to the Cache state, wherein data transmission security policy information available from the local cache source is used to set the active security policy for the network client, if the network client is unable to retrieve the data transmission security policy information from the remote source, and if the network client is able to retrieve the data transmission security policy information from the local cache source;
    transitioning from the Initial state to the Local state, wherein data transmission security policy information available from the local storage source is used to set the active security policy for the network client, if the network client is unable to retrieve the data transmission security policy information from the remote or local cache sources, and if the network client is able to retrieve the data transmission security policy information from the local storage source; and
    remaining in the Initial state if the network client is unable to retrieve the data transmission security policy information from the remote, local cache, and local storage sources.

10. The method according to claim 9, wherein the remote source is a directory service which supports LDAP.

11. The method according to claim 10 wherein the active policy is used to implement the IETF IPSec protocol.

12. The method according to claim 11, further comprising the steps of:

transitioning from an original state which is one of the Remote, Cache, and Local states, wherein an original active policy is applied, to a new state which is another of the Remote, Cache, and Local states upon receipt of a new active policy; and updating the active security policy for the network client by:

changing filters within the original active policy that differ from corresponding filters in the new active policy;

deleting filters from the original active policy that have no correspondence to filters in the new active policy; and adding filters to the original active policy that appear in the new active policy but have no correspondence in the original active policy.

13. A computer-readable medium having computer-executable instructions for performing a method of administering a data transmission security policy for a network client in a computer network comprising the steps of:

establishing in a computer-readable memory of the network client a finite state machine, wherein the finite state machine has Initial, Remote, Cache, and Local states, and wherein the Remote, Cache, and Local states correspond to remote, local cache, and local storage sources of data transmission security policy information respectively;

placing the finite state machine into the Initial state;

transitioning from the Initial state to the Remote state, wherein data transmission security policy information available from the remote source is used to set the active security policy for the network client, if the network client is able to retrieve the data transmission security policy information from the remote source;

transitioning from the Initial state to the Cache state, wherein data transmission security policy information available from the local cache source is used to set the active security policy for the network client, if the network client is unable to retrieve the data transmission security policy information from the remote source, and if the network client is able to retrieve the data transmission security policy information from the local cache source;

transitioning from the Initial state to the Local state, wherein data transmission security policy information available from the local storage source is used to set the active security policy for the network client, if the network client is unable to retrieve the data transmission security policy information from the remote or local cache sources, and if the network client is able to retrieve the data transmission security policy information from the local storage source; and remaining in the Initial state if the network client is unable to retrieve the data transmission security policy information from the remote, local cache, and local storage sources.

14. The computer-readable medium according to claim 13, wherein the remote source is a directory service which supports LDAP.

15. The computer-readable medium according to claim 14 wherein the active policy is used to implement the IETF IPSec protocol.

16. The computer-readable medium according to claim 15, further comprising the steps of:

transitioning from an original state which is one of the Remote, Cache, and Local states, wherein an original active policy is applied, to a new state which is another of the Remote, Cache, and Local states upon receipt of a new active policy; and updating the active security policy for the network client by:

changing filters within the original active policy that differ from corresponding filters in the new active policy;

deleting filters from the original active policy that have no correspondence to filters in the new active policy; and adding filters to the original active policy that appear in the new active policy but have no correspondence in the original active policy.

\* \* \* \* \*